United States Patent Office 3,169,801
Patented Feb. 16, 1965

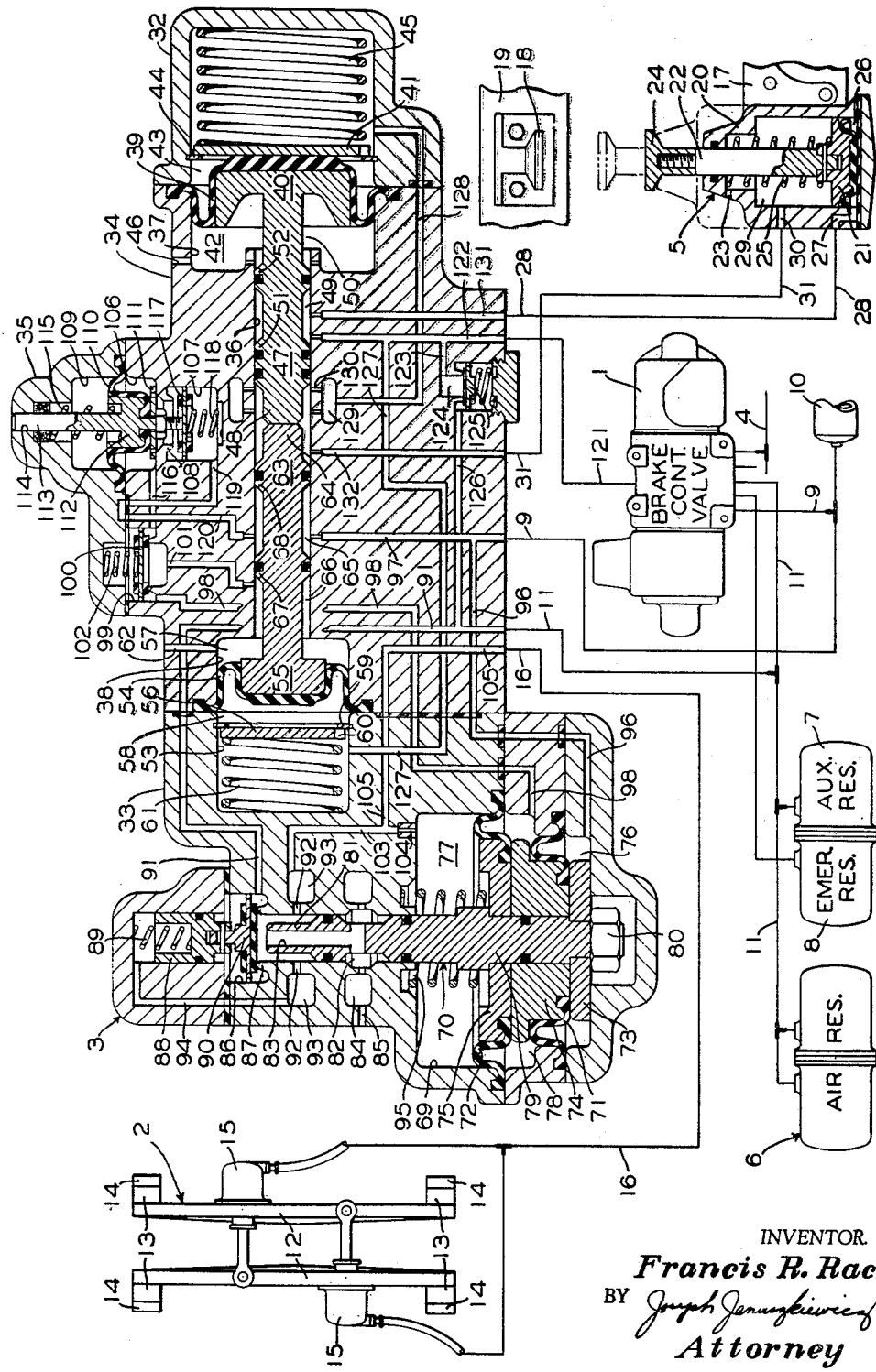

3,169,801
FLUID PRESSURE BRAKE CONTROL APPARATUS WITH EMPTY AND LOAD CHANGEOVER
Francis R. Racki, Pittsburgh, Pa., assignor to Westinghouse Air Brake Company, Wilmerding, Pa., a corporation of Pennsylvania
Filed Mar. 27, 1963, Ser. No. 268,226
12 Claims. (Cl. 303—22)

This invention relates to fluid pressure brake apparatus for railway vehicles and more particularly to load controlled fluid pressure brake apparatus.

In brake systems for railway vehicles employing change-over valve devices to compensate for load or empty as well as for partially loaded vehicles, some difficulty is encountered, under empty or no-load conditions, to provide sufficient pressurization of the brake cylinder to assure movement of the brake shoes into braking engagement with the car wheels for light brake applications.

It is an object of this invention to provide a new and improved change-over valve device for use with brake equipment to assure a full range of braking application in either the load or empty condition of a railway vehicle, insuring that the brake shoes are brought into contact with the brake surface when a minimum brake application is made.

In accordance with this invention, the change-over valve device comprises a casing containing a differential piston in the form of coaxial spaced diaphragms of different size, wherein the diaphragms cooperate with the casing to define three adjoining chambers, i.e., an intermediate chamber and two outer chambers, such that the differential piston is adapted to actuate a valve member cooperative with a valve seat. A load measuring device is operatively connected to the change-over valve device to condition a selector valve under an empty railway car condition to supply pressurized fluid upon a brake application to one of the outer chambers defined by the smaller diaphragm, such that the valve member is actuated to direct controlled actuating pressure fluid into the brake cylinders for a brake application while simultaneously directing a portion of such fluid through a choke into the other outer chamber, balancing chamber, as defined by the larger diaphragm to balance the differential piston and seat the valve member, whereby the brakes are applied with pressurized fluid that is proportionately less than the actuating pressure fluid. In addition, under an empty railway car condition, valve means is provided in the change-over valve device which is responsive to an initial predetermined build-up of pressure in the one outer chamber to provide an inshot wherein a predetermined amount of pressurized fluid is diverted from the supply to the one outer chamber to the intermediate chamber to provide a certain predetermined minimum force or an inshot which actuates the valve member, thereby requiring a predetermined build-up of pressure in the brake cylinders and the balancing chamber whereby the brake shoes are brought into braking contact when a minimum brake application is made. The valve means is set to provide a minimum amount of pressure in the brake cylinders. Under a loaded car condition, the load measuring device conditions the change-over valve device to connect the outer chamber defined by the smaller diaphragm as well as the intermediate chamber to the controlled actuating pressure fluid to unseat the valve member whereby pressure fluid is directed to the brake cylinder and the other outer chamber to balance the differential piston such that the fluid pressure developed in the brake cylinder is equal to the pressure of the controlled actuating fluid and is greater than where only the one outer chamber is pressurized.

In the accompanying drawing:

FIG. 1 is a diagrammatic view of a railway car brake apparatus which includes a cross-sectional view on an enlarged scale of a change-over valve device constructed in accordance with the principles of the invention.

As shown in FIG. 1 of the drawing, the fluid pressure brake apparatus comprises an AB type brake control valve device 1, brake means or brake rigging 2, a load change-over valve device 3, brake pipe 4, load measuring device 5, air reservoir 6, auxiliary reservoir 7, and emergency reservoir 8.

The AB control valve device 1 is of the usual well-known type which responds to the charging of the brake pipe 4 to charge the auxiliary reservoir 7 and emergency reservoir 8 in a manner well known and understood in the art, and which responds to a reduction in pressure in brake pipe 4 to direct pressurized fluid from the auxiliary reservoir 7 via a brake cylinder supply pipe 9 to the load change-over valve device 3. The brake cylinder supply pipe 9 is connected to a displacement volume reservoir 10 to compensate for the limited volume acted upon in the change-over valve device 3 by the pressurized fluid from the air reservoir 6, auxiliary reservoir 7, and emergency reservoir 8. The air reservoir 6, auxiliary reservoir 7, and the AB brake control valve device 1 are interconnected by conduits 11 to a passageway in the change-over valve device 3.

The brake rigging 2 comprises a pair of brake beams 12 that normally extend crosswise of the railway car in parallel spaced relationship to each other. The brake beams 12 are adapted to be movably supported at each end of the side frame members of a car truck in a manner well understood in the art. Supported adjacent the outer ends of each brake beam 12 are brake heads 13 which carry brake shoes 14, respectively, for contact with a tread of an associated wheel. Each brake beam 12 has suitably rigidly secured thereto a brake cylinder 15 in which is reciprocably mounted a piston whose rod is secured to the oppositely disposed brake beam 12 such that pressurization of the respective cylinder ends of each brake cylinder 15 causes the respective brake shoes 14 to contact the associated adjacent wheels for a braking application in a manner well understood in the art. Pressurized fluid is supplied to the respective brake cylinder 15 via a conduit 16 connected to a passageway in a change-over valve device 3.

The load measuring device 5 is mounted on a suitable sprung portion of a railway car, such as the car truck bolster, by a bracket 17 substantially in line with a stop member 18. Stop member 18 is suitably mounted on a bracket 19, which bracket 19 is suitably attached to an unsprung part of the car truck, such as the side frame of the car truck. Engagement between stop member 18 and the load measuring device 5 is achieved in a manner to be described.

The load measuring device 5 comprises a vertically disposed cylindrical strut cylinder 20, in which cylinder 20 is slidably mounted a control piston 21 having a piston rod 22 extending through and slidably guided in the non-pressure head in the upper portion thereof. The upper end portion of cylinder 20, closely adjacent the non-pressure head, is vented to atmosphere via a port 23. The uppermost end portion of piston rod 22 has a stop member 24 suitably adjustably mounted thereon for engagement with stop member 18. A spring 25 encompassing the piston rod 22 has its upper end portion seated on the upper end portion of strut cylinder 20 and its lowermost end portion engaging the piston 21, whereby spring 25 urges the piston 21 to its lowermost position in the strut cylinder 20. A pressure chamber 26 at the lower end portion of strut cylinder 20 defined by the piston 21 and the lowermost end portion of the cylinder 20 is connected via a passageway 27 to a conduit 28 for connection to the change-over valve device 3. A non-pressure chamber 29 at the upper end portion of the strut cylinder 20, defined by the piston 21 and the upper end portion of the strut cylinder 20, is connected via a passageway 30 to a conduit 31 for connection to the change-over valve device 3.

With the railway car loaded, the stop member 24 is a greater distance from the stop member 18 than when the railway car is empty since the stop member 24 is on the sprung portion of the railway car and the springs supporting the sprung portion are compressed in accordance with the degree of loading on the sprung portion.

When the railway car is loaded, the position of the stop member 24 and strut cylinder 20 relative to the stop member 18 and the bracket 19 on the unsprung portion of the car truck is such as is shown in full lines in FIG. 1, wherein the stop member 24 is adapted to move into abutting engagement with the stop support member 18 upon pressurization of chamber 26 via a conduit 28 so as to connect passageway 27 with passageway 30 and conduit 31. When the railway car is empty or partially unloaded, the strut cylinder 20 relative to the unsprung portion 19 of the car assumes a position such that the stop member 24 will be relatively close to stop member 18 since the car springs are not compressed as greatly, such that upon pressurization of chamber 26 via conduit 28, piston 21 will move upwardly a limited amount due to engagement of stop member 18 by stop member 24. In this position of piston 21, passageway 30 will not be uncovered and communication will be blocked between passageways 27 and 30.

The term "empty railway car," as used, designates an unloaded, partially loaded or empty condition of a railway car, such that on pressurization of chamber 26, the upward movement of piston 21 is insufficient to establish communication between passageways 27 and 30, whereas, a "loaded railway car" designates a railway car that is fully loaded or partially loaded, such that on pressurization of chamber 26, the upward movement of piston 21 is sufficient to establish communication between passageways 27 and 30.

The load change-over valve device 3 comprises a housing having a pair of end sections 32 and 33, an intermediate section 34, and an upper section 35. End section 32 is generally cup-shaped while end section 33 is sectionalized.

Intermediate section 34 has a bore 36 extending longitudinally therethrough, which bore 36 has its respective end portions enlarged as 37 and 38, respectively. End section 32, cup-shaped, is suitably connected to the intermediate section 34 with the open end thereof being of substantially the same diameter as enlarged bore portion 37. A resilient diaphragm 39 has its outer peripheral edge clamped between the one end of intermediate section 34 and the cup-shaped end section 32 and its central portion thereof suitably secured to a piston follower 40 located in enlarged bore portion 37 of intermediate section 34. A circular follower disc 41 located in end section 32 abuttingly engages the central portion of resilient diaphragm 39. Diaphragm 39 cooperates with the intermediate section 34 to define a chamber 42 in enlarged bore portion 37 and cooperates with the cup-shaped end section 32 to define a chamber 43. The end section 32 closely adjacent the intermediate portion 34 is internally annularly recessed to receive an annular stop ring 44 which limits the movement of follower disc 41 toward the intermediate section 34. A spring 45 located in chamber 43 has one end seated on the closed end portion of cup-shaped end section 32 and its other end abuttingly engaging follower disc 41 thereby biasing follower disc 41 into engagement with stop ring 44 and diaphragm 39 as limited by stop ring 44. Follower disc 41 is suitably recessed or grooved at its outer periphery to maintain fluid communication between all portions of chamber 43, particularly when disc 41 engages stop ring 44. The intermediate section 34 has a port 46 connecting chamber 42 with atmosphere for maintaining chamber 42 at atmospheric pressure at all times. Follower piston 40 has a cylindrical stem 47 reciprocably mounted in the bore 36 of intermediate section 34. Stem 47 has a reduced end portion 48 and a pair of spaced grooves 49 and 50 defining a pair of spaced lands 51 and 52, which lands 51 and 52 slidingly contact the inner wall surface of bore 36.

End section 33 has a bore 53 of the same diameter as bore 38 and defines a continuous bore therewith upon connection of end section 33 to intermediate section 34. A resilient diaphragm 54 suitably located in the enlarged bore portion 38 of the intermediate section 34 has its outer peripheral edge clamped between the end section 33 and the intermediate section 34 with its central cup-shaped portion suitably secured to a piston follower 55. A flat circular follower disc 56 located in bore 53 of end section 33 is adapted to abuttingly engage the central portion of resilient diaphragm 54. Diaphragm 54 cooperates with the bore 38 of intermediate section 34 to define a chamber 57, and cooperates with bore 53 of end section 33 to define a chamber 58. End section 33 closely adjacent to intermediate section 34 is internally annularly recessed to receive an annular stop ring 59 which limits the movement of follower disc 56 toward the intermediate section 34. Follower disc 56 is recessed at its outer periphery, as at 60, to maintain fluid communication between all portions of chambers 58 such as when disc 56 abuttingly engages stop ring 59. A spring 61 located in chamber 58 has one end seated on the closed end portion of bore 53 in end section 33 and its other end abuttingly engaging follower disc 56 for biasing follower disc 56 into engagement with the stop ring 59 or diaphragm 54 upon leftward movement of diaphragm 54 as viewed in FIG. 1. The intermediate section 34 has a port 62 connecting chamber 57 with atmosphere for maintaining chamber 57 at atmospheric pressure at all times. The piston follower 55 has a stem 63 extending into and slidably guided by the walls of bore 36 of the intermediate section 34. Stem 63 has a reduced end portion 64 abuttingly engaging the reduced end portion 48 of stem 47 and a pair of spaced grooves 65 and 66 defining a pair of spaced lands 67 and 68 which slidingly contact the inner wall surface of bore 36.

Sectionalized section 33, in addition to having a bore 53, has a longitudinally extending stepped bore 69 which houses a differential relay valve member 70, which relay valve member 70 has a pair of spaced resilient diaphragms 71 and 72. The outer peripheral edges of resilient diaphragms 71 and 72 are clamped between portions of the sectionalized section 33. The inner peripheral edge of resilient diaphragm 71 is suitably clamped between a lower follower disc 73 and a follower disc 74, while resilient diaphragm 72 has its inner peripheral edge clamped between follower disc 74 and an upper follower disc 75. Resilient diaphragm 71 and lower follower disc 73 cooperate with the lower end portion of section 33 and the stepped bore 69 to define a lower chamber 76, while resilient diaphragm 72 and upper follower disc 75 cooperate with the end section 33 and the stepped bore 69 to define an upper chamber 77. Diaphragm 71 and follower disc 74 cooperate with the diaphragm 72 and upper follower disc 75 along with the end section 33 and the stepped bore 69 to define an intermediate chamber 73 therebetween. The effective area of diaphragm 71 is less than the effective area of diaphragm 72 to thereby provide a differential relay valve whose effective force developed for displacement of a valve stem connected thereto is dependent on which of such chambers are pressurized.

Follower discs 73, 74 and 75 are suitably clamped together between a shoulder on the intermediate portion of a valve stem 79 and a nut 80 threaded on the lowermost end portion thereof. Valve stem 79 has a reduced end portion 81 and an annular groove 82 around the intermediate portion thereof. The uppermost reduced end portion of valve portion 80 has bore 83 extending longitudinally therein communicating the annular groove 82 with the uppermost end portion of stepped bore 69. In the position shown in FIG. 1, annular groove 82 communicates through a plurality of radially extending ports in section 33 to an annular bore 84, which annular bore 84 is connected to atmosphere through a port 85 in sectionalized casing 33. The upper end portion of stepped bore 69 has an enlarged bore portion 86 such as to present a sealing bead 87 on the lower end portion thereof for a purpose to be described.

Slidably received within the upper end portion of stepped bore 69 is a piston valve device 88, which piston valve device 88 has one end centrally recessed to provide a seat for a spring 89 which biases piston valve 88 downwardly as viewed in FIG. 1. Valve device 88 is suitably connected to a flat valve member 90, which valve member 90 is normally seated through the biasing action of spring 89 on the sealing bead 87. Valve member 90 is subject to being displaced upwardly by the upward movement of valve stem 79 in a manner to be described. Enlarged bore portion 86 of stepped bore 69 is suitably connected via a passageway 91 to conduit 11, which conduit 11 interconnects air reservoir 6, auxiliary reservoir 7 and the brake control valve device 1. The clearance space provided between the wall surface of stepped bore 69 immediately below the enlarged bore portion 86 as viewed in FIG. 1 and the reduced end portion 81 of stem 79 is suitably connected via a plurality of radially extending ports 92 to an annular bore 93. Annular bore 93 is connected via a passageway 94 to the uppermost end portion of stepped bore 69 to provide equalization of pressures therebetween for a purpose to be described. A closed end helical spring 95 encompassing the intermediate portion of stem 79 has one end seated on a shoulder in the stepped bore 69 and the other end seated on the upper follower disc 75 for biasing differential relay valve member 70 downwardly as viewed in FIG. 1 until lower follower disc 73 abuttingly engages the lower end portion of stepped bore 69. Upward displacement of stem 79 unseats valve member 90 and interconnects stepped bore 69 with the enlarged bore portion 86 and the passageway 91 with annular bore 93 for a purpose to be described.

Lower chamber 76 is connected to a passageway 96 which is connected to a passageway 97, which passageway 97 interconnects conduit 9 and the longitudinally extending bore 36 in the intermediate section 34. Intermediate chamber 78 is connected via a passageway 98 to a bore 99 in the upper end portion of intermediate section 34. Bore 99 contains a spring biased check valve 100 which has an inner seated portion connected via a passageway 101 to the left-hand portion of bore 36, as viewed in FIG. 1. Check valve 100 is normally biased by a spring 102 to block communication between passageways 98 and 101. Upper chamber 77 is connected via a passageway 103 through a restricted port 104 to annular bore 93 and via a branch passageway 105 to conduit 16, which conduit 16 is connected to the respective brake cylinders 15.

The upper end portion of intermediate section 34 has a stepped bore having an upper enlarged bore portion 106 and a lower reduced bore portion 107 presenting an annular shoulder 108 therebetween. Intermediate upper section 35, suitably secured to the upper end section 34, is suitably recessed to define a bore 109, which bore 109 has the same diameter as enlarged bore portion 106 and is substantially continuous therewith. A resilient diaphragm 110 has its outer peripheral edge clamped between intermediate upper section 35 and intermediate section 34 with its inner peripheral edge clamped between a lower follower valve disc 111 and an upper follower disc 112, which follower disc 112 has an upwardly extending stem 113 which is guided by a bore 114 in the upper end portion of the intermediate upper section 35.

A spring 115 located in bore 109 has its upper end portion seated on a recess on the intermediate upper section 35 and its lower end portion engaging follower disc 112 to thereby bias follower disc 112, follower valve disc 111 and diaphragm 110 downwardly. Bore 106 is connected via a passageway 116 to the intermediate portion of bore 99 for connection to passageway 98. The lowermost end portion of stem 113, as viewed in FIG. 1, abuttingly engages a circular flat valve member 117 located in bore 107, which valve member 117 is adapted to engage and seat on annular shoulder 108 on upward movement of resilient diaphragm 110. A spring 118, located in the lowermost end of reduced bore portion 107, has its lower end portion seated on the intermediate section 34 and its upper end portion abuttingly engaging the flat valve member 117. Spring 118 and spring 115 work in opposition to each other and are so chosen that valve member 117 and follower valve disc 111 remain unseated and normally interconnect reduced bore portion 107 with enlarged bore portion 106. The lower end of reduced bore portion 107 is connected to bore 36 via passageways 119 and 120, with passageway 120 communicating with bore 36 substantially at the same location as passageway 97.

In accordance with the usual practice, charging pipe 121 has one end constantly open to the brake pipe 4 through the brake control valve device 1, and the other end connected to a passageway 122 in the changeover valve device 3. Passageway 122 is connected to bore 36 and via a branch passageway 123 to a chamber 124 which contains a one-way check valve device 125 operative to direct pressurized fluid only from the branch passageway 123 through chamber 124 to a branch passageway 126 which is connected to passageway 91 in the left-hand portion of the intermediate section 34 of change-over valve device 3, as viewed in FIG. 1. Passageway 122 has a branch passageway 127 connected to chamber 58.

Chamber 43 of end section 32 is connected to bore 36 via a passageway 128 through an annular bore 129 and ports 130. Conduit 28 from load measuring device 5 is connected to bore 36 in change-over valve device 3 via a passageway 131, while conduit 31 from chamber 29 in load measuring device 5 is connected to bore 36 in change-over valve device 3 via a passageway 132.

In the operation of brake apparatus described, it is to be assumed that an empty condition of a railway car is present wherein strut cylinder 20 relative to the unsprung portion, bracket 19 of the railway car, assumes a position such that the stop member 24 will be relatively close to the stop member 18 since the car springs are not compressed as greatly as when the car is loaded, such that upon pressurization of chamber 26 via conduit 28, in a manner to be described, piston 21 will move upwardly in strut cylinder 20 only a limited amount due to engagement of stop member 23 by stop member 18. In this position, communication will be blocked between passageways 27 and 30. In addition to an empty condition of a railway car, assume initially that the brake pipe 4 is charged to its normal charge value by supply of fluid under pressure to the brake pipe 4 in the well known manner, and that the brake control valve device 1 responds to the charging of the brake pipe 4 to charge air reservoir 6, auxiliary reservoir 7 and emergency reservoir 8 with fluid at the pressure of the fluid in the brake pipe 4 while simultaneously strained air flows through control valve device 1, conduit 121, passageway 122, to charge chamber 26 in the lower end portion of strut cylinder 20 of load measuring device 5, and chamber 58 in end section 33. Chamber 26 is charged from passageway 122 via annular groove 49, passageway 131 and conduit 28, whereas chamber 58 is charged from passageway 122 via branch passageway 127. Since the railway car is in an empty condition as discussed above, wherein the stop member 24 is relatively close to stop member 18, pressurization of chamber 26 produces no result since the upward movement of control piston 21 does not establish communication between passageways 27 and 30; however, the flow of pressurized fluid from passageway 122 via branch passageway 127 pressurizes chamber 58 to provide a reactionary force on diaphragm 54 and piston follower 55 to thereby move the diaphragm 54 and piston follower 55 rightward as viewed in FIG. 1 to condition the change-over valve device 3 for operation. In such rightward movement of diaphragm 54 and follower member 55, diaphragm 39 and follower member 40 move along with valve stems 47 and 63 in a rightward direction. Such movement blocks the connection between passageway 122 and passageway 131; however, such action connects chamber 26 in strut cylinder 20 to atmosphere via conduit 28, passageway 131, annular groove 49 in stem 47, chamber 42 and port 46. Spring 25 biases control piston 21 downwardly to disengage stop member 24 from stop member 18 to thereby return the load measuring device 5 to an inactive position. Pressurization of the respective air reservoirs connects pressurized fluid via conduit 11 to passageway 91 in change-over valve device 3, thence to pressurize the bore 86 to thereby condition the change-over valve device 3 for a braking operation in a manner to be described.

When brake pipe pressure is reduced under operator control in the usual manner for causing a brake application, brake control valve device 1 operates to supply fluid from air reservoir 6 and auxiliary reservoir 7 to brake cylinder supply pipe 9 which flows via passageway 97 and branch passageway 96 to pressurized chamber 76, while simultaneously flowing via passageway 97, annular groove 65, through passageways 120, 119 into reduced bore portion 107, past valve member 117, past valve disc 111, through enlarged bore portion 106, through passageway 116, bore 99, passageway 98 to pressurized chamber 78. The resultant force developed by the pressurization of chambers 76 and 78, in effect, governed by the pressurization of chamber 78 since diaphragm 71 is common to both chambers 76 and 78, moves differential relay valve member 70 upwardly as viewed in FIG. 1 until reduced end portion 81 of valve stem 79 unseats valve member 90 to interconnect the pressurized fluid from bore 86 to the clearance space provided between the wall of stepped bore 69 and the reduced end portion 81 of relay valve member 70, such that pressurized fluid flows via passageway 103 simultaneously to chamber 77 and brake cylinder 15, wherein brake cylinders 15 received pressurized fluid via passageway 103, passageway 105 and conduit 16.

The amount of pressure developed in chamber 78 is determined by the value of springs 118 and 115 in bores 107 and 109 such that when approximately 12 p.s.i. is developed in chamber 78 and bore 106, valve disc 111 and valve member 117 moves upwardly blocking communication between bores 106 and 107 to thereby interrupt the flow of pressurized fluid to chamber 78. Such action assures that a certain minimum pressure is developed in chamber 78 which effects the unseating of valve member 90 which, in turn, assures the pressurization of brake cylinders 15 to provide a minimum brake application. Any further pressure developed in reduced bore portion 107 serves to maintain valve member 117 seated so that pressurized fluid from the air reservoir 6 and auxiliary reservoir 7 flows through the control valve device 1 via conduit 11, passageway 97, passageway 96 to pressurized chamber 76, only which hereafter controls the degree of brake pressure developed in brake cylinders 15.

The pressurized fluid in bore 86 which, as stated previously, exists due to the connection to the air reservoir 6 via passageway 91 and conduit 11, flows past unseated valve member 90, past the clearance space between the reduced end portion 81 of stem 79 and the wall of bore 69, through port 92, annular groove 93, passageway 103 to pressurized chamber 77 until sufficient force is developed to balance the force on valve stem 79 developed in chamber 76, such that equalization of forces allows spring 89 to seat valve member 90 and cut off the further flow of pressurized fluid to the brake cylinders 15.

It is to be noted that the communication to chamber 78 provides an initial movement to differential relay valve member 70 such that balancing of pressure in chamber 78 by pressurization of chamber 77 is on a one to one basis up to 12 p.s.i. since diaphragm 72 is common to both of these chambers, thereby assuring that the pressure in brake cylinder 15 will be established to bring the brake shoes into braking position, whereas if only chamber 76 where pressurized to unseat valve member 90, the pressure necessary in chamber 77 to balance the pressure in chamber 76 would be less than a one to one ratio since diaphragm 71 acted upon by chamber 76 is less in effective area than diaprhagm 72 acted upon by chamber 77, so that in the event that only 12 p.s.i. were introduced into chamber 76, less pressure than 12 p.s.i. would be developed in chamber 77 and the brake cylinders 15, which action would be insufficient to bring the brake shoes into contact with the tread of the associated wheel of the railway car.

A further reduction in brake pipe pressure initiates a similar cycle in that the brake control valve device 1 establishes communication between air reservoir 6, auxiliary reservoir 7 and conduit 9 to pressurize chamber 76 which unseats valve member 90 to thereby direct pressurized fluid from air reservoir 6 and auxiliary reservoir 7 via conduit 11, passageway 91, past valve member 90 via passageway 103, passageway 105, conduit 16 to pressurized brake cylinder 15 for a further increase in braking application until upper chamber 77 is sufficiently pressurized by pressurized fluid past valve member 90 and via passageway 103 through choke 104 to balance the increased force developed in chamber 76. The pressure necessary in chamber 77 to balance the pressure in chamber 76 is inversely proportional to areas of the respective diaphragms. Annular groove 93 is connected via a branch passageway 94 to the rearward portion or upper portion of stepped bore 69 to pressurize such portion and thereby bias valve member 90 downwardly as viewed in FIG. 1, which biasing action assures the closing of valve member 90 upon movement of valve stem 79 downwardly upon the balancing action of pressurization of chamber 77.

When the pressure in the brake pipe 4 is increased to thereby release the brakes, the brake cylinder supply pipe 9 via control valve device 1 is connected to atmosphere thereby connecting lower valve chamber 76 via passageway 96 and supply pipe 9 to atmosphere and consequently moving differential relay valve 70 downwardly as viewed in FIG. 1 until follower disc 73 engages lower end portion of stepped bore 69. Such action connects the brake cylinders 15 via conduit 16 to passageway 105 which is connected to annular groove 93 in the upper end portion of stepped bore 69, and thence via bore 83 in valve stem 79 and via annular bore 84 through port 85 for venting to atmosphere. In addition to such action since conduit 9 is connected to atmosphere through the brake control valve device 1, reduced bore portion 107 is similarly vented to atmosphere via passageway 97 connected to conduit 9 to thereby relieve the pressure underneath the valve member 117 so that the respective springs 118 and 115 will position the valve disc 111 and valve member 117 to their neutral position to thereby establish communication between the reduced bore portion 107 and the bore portion 106 to thereby vent chamber 78 to atmosphere via passageway 98, bore 99, passageway 116, through the respective bore portions 107 and 106, via passageways 119 and 120 to passageway 97 and thence via conduit 9 to atmosphere.

Assuming that the brake pipe 4 has been vented to below 8 to 10 p.s.i. or to atmosphere for an emergency application of the brakes such that fluid pressure in conduit 121, passageway 122, branch passageway 127, as well as chamber 58, will be vented to atmosphere, thereby subjecting stems 47 and 63, piston followers 40 and 55 only to the forces of springs 45 and 61 which thereby centers the stems 47 and 63 into their neutral position. Recharging of the brake pipe 4 under these conditions causes the load measuring device 5 to check the load or empty condition of the railway car and thereby conditions the change-over valve device 3 in the manner to be described.

It should be noted that the load measuring device 5 is actuated to register a loaded or empty condition of a railway car whenever an emergency brake pipe reduction has been effected such that the stems 47 and 63 return to neutral and are in condition for directing fluid to the load measuring device 5. Assuming a neutral position of stems 47 and 63 and a loaded condition of a railway car, the position of the strut cylinder 20 relative to the unsprung portion 19 of the railway car is such as is shown in full lines in FIG. 1, wherein the stop member 24 on the movable piston rod 22 is in such a position that upward movement of the stop member 24 relative to the stop member 18 is such as to uncover passageway 30 to establish communication between passageways 27 and 30. Pressurized fluid from the brake pipe 4 flows via conduit 121, passageway 122 into annular groove 49 and thence via passageway 131 and conduit 28 to pressurize chamber 26 in strut cylinder 20 to thereby move control piston 21 upwardly to establish communication between passageways 27 and 30 to thereby pressurize conduit 31 which conducts pressurized fluid via passageway 132 to bore 36, thence via ports 130 and annular groove 129 into passageway 128 to pressurize chamber 43, the right-hand portion of change-over valve device 1. Simultaneously with such action, pressurized fluid flows via conduit 121 and passageway 122 into passageway 127 to chamber 58 on the left-hand portion of change-over valve device 3 to pressurize such chamber and exert a force on diaphragm 54 and follower member 55 in a rightward direction; however, such force is counteracted on by the forces established on diaphragm 39 and follower member 40 through pressurization of chamber 43. The differential force developed on the respective diaphragms and their follower members due to diaphragm 39 and follower member 40 being larger in cross-sectional area than the diaphragm 54 and piston follower member 55 moves the respective stems 47 and 63 and diaphragms leftwardly as viewed in FIG. 1 to thereby register annular groove 49 on stem 47 for the respective passageways 122 and 130, which action conducts pressurized fluid from the brake pipe 4 via conduit 121 and passageway 122, groove 49, via port 130 and annular bore 129 and via passageway 128 to chamber 43 on a rightward portion of the change-over valve device 3 to maintain diaphragm 39 and follower member 40 as well as stems 47 and 63 in the newly registered position. Such action vents chamber 26 is strut cylinder 20 to atmosphere since the annular groove 50 on stem 47 registers passageway 131 with chamber 42 such that the chamber 26 is connected or vented to atmosphere via passageway 27, conduit 28, passageway 131, annular groove 50, chamber 42 and port 46, thereby locking out the load measuring device 5 until the brake pipe pressure is reduced to atmosphere which recenters the respective stems 47 and 63 in a manner described above. The upper end portion of strut cylinder 20 is vented to atmosphere via port 23.

While the railway vehicle is in the loaded car condition and the brake pipe pressure is reduced under operator control in the usual manner for causing a brake application, brake control valve device 1 operates to supply fluid from air reservoir 6 and auxiliary reservoir 7 to the brake cylinders 15 via conduit 11 and brake cylinder supply pipe 9, passageway 97 to annular groove 65 on stem 63, thence via passageway 101 to unseat valve member 100 and thence past valve member 100 and through passageway 98 to pressurize chamber 78 whereby relay valve member 70 moves upwardly as viewed in FIG. 1 to unseat valve member 90. In addition to such action, pressurized fluid flows via conduit 11 from air reservoir 6 and auxiliary reservoir 7 to passageway 91 to pressurize enlarged bore portion 86 such that upon unseating of valve member 90, fluid flows via the clearance space between reduced end portion 81 of stem 79 and the wall portion of stepped bore 69 via passageway 92, annular bore 93, passageway 103, passageway 105, conduit 16 to brake cylinders 15 while simultaneously flowing through choke 104 to the upper chamber 77. When the fluid pressure in upper chamber 77 is sufficient to overcome the fluid pressure in intermediate chamber 78, an equalization of net differential forces develops to seat valve member 90 and effect a full braking application in brake cylinders 15. A one to one ratio braking application is provided since the area of diaphragm 72 is common to both chambers 77 and 78. The pressurization of chamber 76 via passageway 96 and supply pipe 9 is neutralized in effect by the pressurization of chamber 78 since diaphragm 71 is common to both chambers 76 and 78.

With valve stems 63 and 47 registered in the loaded railway car condition as described above, groove 65 on stem 63 interconnects passageways 101 with 97 such that upon a pressurization of conduit 9, following a braking application, pressurized fluid flows via passageways 97, 101, past valve member 100, passageway 116 to pressurize the lower portion of bore 106 to move diaphragm 110 and stem 113 upwardly as viewed in FIG. 1, such that stem 113 projects through the bore 114 in upper section 35 to thereby indicate a full braking application and a loaded railway car condition.

When the pressure in the brake pipe 4 is increased to thereby release the brakes, the brake cylinder supply pipe 9 via control valve device 1 is connected to atmosphere to thereby vent the brake cylinders 15 as well as the chambers 76, 68 and 79 of the differential relay valve member 70 in the manner described above.

Having now described the invention, what I claim as new and desire to secure by Letters Patent, is:

1. A load compensating brake system comprising:
   (a) a brakepipe,
   (b) brake cylinder means operative upon actuation to effect a braking application,
   (c) a change-over valve device having selector valve means operable between a first and second position,
   (d) brake controlling means responsive to a reduction in pressure in said brake pipe to supply fluid under pressure to a first conduit, and responsive to a subsequent increase in brake pipe pressure to release fluid under pressure from said first conduit,
   (e) means for selectively positioning said selector valve means,
   (f) relay valve means in said change-over valve device operative upon actuation thereof to connect a pressure source to said brake cylinder means for actuation thereof,
   (g) said relay valve means cooperative with said selector valve means in said first position to connect fluid from said first conduit to said relay valve means for actuation thereof to provide one braking action,
   (h) said relay valve means cooperative with said selector valve means in said second position to connect fluid from said first conduit to said relay valve means for actuation thereof to provide a second braking action wherein said first and second braking action are different in degree, and
   (i) valve means in said change-over valve device cooperative with said selector valve means in said first position to connect fluid from said first conduit to said relay valve means for actuation thereof to provide said second braking action up to a predetermined amount.

2. A change-over valve device having:
   (a) a casing,
   (b) an input connection, (c) selector valve means operative between a first and second position,
(d) means for moving said selector valve means into said first and second position,
(e) a normally seated valve member operative upon actuation to connect a pair of passageways, wherein one of said passageways is adapted to be connected to a pressure source.
(f) relay valve means having a pair of spaced diaphragms of different effective areas cooperative with said casing to define pressure chambers,
(g) one of said diaphragms being common to a pair of adjacent pressure chambers,
(h) said relay valve means having one of said adjacent pressure chambers connected to said imput connection for actuation thereof and actuation of said valve member upon pressurization of said input connection,
(i) said selector valve means in one of said positions connecting the other of said adjacent pressure chambers to said input connection for actuation of said relay valve means and actuation of said valve member upon pressurization of said imput connection.
(j) said relay valve means cooperative with a portion of said casing to define a balancing chamber,
(k) the other of said diaphragms being common to said balancing chamber and said other pressure chamber,
(l) said balancing chamber operatively connected to the other of said passageways for pressurization of said balancing chamber to balance pressure in said pressure chambers for seating said valve member,
(m) normally open valve means interconnecting said input connection to said other pressure chamber, and
(n) said valve means responsive to a predetermined pressure in said input connection to block communication between said input connection and said other pressure chamber.

3. A change-over valve device as set forth in claim 2 wherein:
(a) said input connection is operatively connected to a brake control valve device,
(b) a brake pipe,
(c) said brake control valve device responsive to a reduction in pressure in said brake pipe to supply fluid under pressure from a pressure source to said input connection.

4. A change-over valve device as set forth in claim 2 wherein:
(a) a brake cylinder means effective for making a braking application is operatively connected to said other passageway.

5. A change-over valve device as set forth in claim 4 wherein:
(a) said selector valve means is operative in said one position to connect said input means to an indicator means, and
(b) said indicator means cooperative with said selector valve means in said second position to indicate a loaded condition upon pressurization of said input means.

6. A load compensating brake system for a railway car comprising:
(a) a brake pipe,
(b) brake cylinder means for effecting a braking application,
(c) brake controlling means responsive to a reduction in pressure in said brake pipe to supply fluid under pressure from a pressure source to a first conduit, and responsive to a subsequent increase in brake pipe pressure to release fluid under pressure from said first conduit,
(d) a change-over valve device having selector valve means operable between a first and second position,
(e) means for selectively positioning said selector valve means,
(f) said change-over valve device having:
(i) a casing,
(ii) a normally seated valve member operative upon actuation to connect a pair of passageways, wherein one of said passageways is connected to said first conduit,
(iii) relay valve means having at least a pair of spaced diaphragms of different effective areas cooperative with said casing to define three adjacent pressure chambers,
(iv) a pair of said pressure chambers operative upon pressurization of one or both of said chambers to actuate said normally seated valve member,
(v) the other of said three pressure chambers operatively connected to the other of said passageways for pressurization of said other chamber to deactuate said normally seated valve member,
(vi) one of said pair of said pressure chambers connected to said first conduit,
(vii) said relay valve means cooperative with said selector valve in one of said positions to connect the other of said pair of pressure chambers to said first conduit,
(viii) a normally open valve means interconnecting said first conduit to the other of said pair of said pressure chambers, and
(ix) said valve means responsive to a predetermined pressure in said first conduit to block communication between said input connection, first conduit, and said other pressure chamber of said pair of chambers.

7. A load compensating brake system comprising:
(a) a brake pipe,
(b) brake cylinder means for effecting a braking application,
(c) brake controlling means responsive to a reduction in pressure in said brake pipe to supply fluid under pressure from a pressure source to a first conduit, and responsive to a subsequent increase in brake pipe pressure to release fluid under pressure from said first conduit,
(d) a change-over valve device having selector valve means operable between a first and second position,
(e) said change-over valve device having:
(i) relay valve means operative upon actuation to connect pressurized fluid from a reservoir to a passageway in said change-over valve device,
(ii) said relay valve means cooperative with said selector valve means in one position to condition pressurization of said passageway to a first pressure,
(iii) said relay valve means cooperative with said selector valve means in said second position to condition pressurization of said passageway to a second pressure, and
(iv) valve means cooperative with said selector valve means in said one position to condition pressurization of said passageway to said second pressure up to a predetermined pressure wherein said valve means is ineffective beyond said predetermined pressure.

8. A load compensating brake system for a railway car comprising:
(a) a brake pipe,
(b) brake cylinder means operative upon actuation for effecting a braking application,
(c) a pressure source,
(d) brake controlling means responsive to a reduction in pressure in said brake pipe to supply fluid under pressure from said pressure source to a first conduit, and responsive to a subsequent increase in brake pipe pressure to release fluid under pressure from said first condit, (e) a change-over valve device having selector valve means operable between a first and second position, (f) means for positioning said selector valve means into said first or said second position, (g) said change-over valve device including:
  (i) a casing,
  (ii) a normally seated valve member operative upon actuation to connect a pair of passageways, wherein one of said passageways is connected to said pressure source and the other of said passageways is connected to said brake cylinder means,
  (iii) relay valve means having a pair of spaced diaphragms of different effective areas cooperative with said casing to define an intermediate pressure chamber and two outer pressure chambers,
  (iv) said relay valve means operative upon actuation to actuate said normally seated valve member,
  (v) one of said outer pressure chambers connected to said first conduit, wherein pressurization of said first conduit actuates said relay valve means,
  (vi) said selector valve means operable in said first position to connect said first conduit to said intermediate chamber for actuation of said relay valve means operable in said second position to connect said first conduit via a second conduit to a valve chamber,
  (vii) said valve chamber housing a normally open valve means effective to connect said second conduit to said intermediate pressure chamber for actuation of said relay valve means upon pressurization of said first conduit,
  (viii) said valve means responsive to a predetermined pressure in said valve chamber to block communication between said second conduit and said intermediate pressure chamber, and
  (ix) the other of said outer chambers connected to said other of said passageways for pressurization of said other outer chamber to balance the pressures developed in said intermediate chamber and said one outer chamber to thereby deactuate said relay valve means and said normally seated valve member.

9. A load compensating system for a railway car comprising:
  (a) a brake pipe,
  (b) brake cylinder means operative upon actuation for effecting a braking application,
  (c) brake controlling means responsive to a reduction in pressure in said brake pipe to supply fluid under pressure from a pressure source to a first conduit, and responsive to a subsequent increase in brake pipe pressure to release fluid under pressure from said first conduit,
  (d) a change-over valve device having selector valve means operable between a first and second position,
  (e) means for positioning said selector valve means into said first or said second position,
  (f) said change-over valve device having:
    (i) a casing,
    (ii) a normally seated valve member operative upon actuation to connect a first and second passageway wherein said first passageway is connected to a pressure source and said second passageway is connected to said brake cylinder means,
    (iii) relay valve means having at least a pair of spaced diaphragms of different effective areas cooperative with said casing to define an intermediate pressure chamber and two outer chambers,
    (iv) one of said outer chambers connected to said first conduit,
    (v) said selector valve means operative in said one position to connect said first conduit to a third passageway,
    (vi) said third passageway connected to a first valve chamber to which valve chamber is connected a fourth passageway for connection to said intermediate chamber,
    (vii) said first valve chamber houses a normally closed one-way check valve,
    (viii) said check valve being operative upon pressurization of said third passageway to pass fluid only into said fourth passageway and inoperative to pass fluid from said fourth passageway to said third passageway,
    (ix) said selector valve means operative in said second position to connect said first conduit via a second conduit to a second valve chamber,
    (x) said second valve chamber housing a normally open valve means effective to connect said second conduit to said fourth passageway,
    (xi) said valve means responsive to a predetermined pressure in said second valve chamber to block communication between said valve chamber and said intermediate pressure chamber,
    (xii) indicator means operatively connected to said valve means, and
    (xiii) said indicator means responsive to a predetermined pressure in said third passageway to register a loaded condition of a railway car.

10. For use in a fluid pressure brake system for railway cars of the type having a brake cylinder for effecting braking application according to the degree of pressurization threin, a brake pipe normally charged with fluid pressure at a certain pressure, and a control valve device operatively responsive to the normal pressures carried in the brake pipe to effect release of fluid pressure from the brake cylinder and operatively responsive to reduction of the pressure normally carried in the brake pipe to effect supply of fluid under pressure from a source to a conduit, a change-over valve device interposed between said conduit and said brake cylinder, said change-over valve device comprising:
  (a) a casing,
  (b) a plurality of fluid pressure responsive abutments of different effective areas respectively coaxially disposed in said casing to provide an outer control chamber, an intermediate control chamber and a pressure balancing chamber,
  (c) valve means operative to effect supply of fluid under pressure from said source to pressurize to different degrees the brake cylinder upon pressurization of said outer control chamber or said intermediate control chamber individually,
  (d) constantly open passageway means connecting said conduit to said outer control chamber,
  (e) selector valve means selectively conditioned to establish a communication between said conduit and said intermediate control chamber or cut off said communication, and
  (f) fluid pressure responsive valve means effective to supply fluid under pressure from said conduit to said intermediate control chamber so long as the pressure in said conduit does not exceed a certain pressure.

11. For use in a fluid pressure brake system as set forth in claim 10 wherein said fluid pressure responsive valve means has a normally open pressure balanced valve operative upon a predetermined pressure in said conduit to block communications between said conduit and said intermediate control chamber.

12. A change-over valve device comprising:
  (a) a casing, (b) conduit means pressurizable with varying fluid pressure,
(c) selector valve means operative between a first position and a second position,
(d) means for moving said selector valve means into said first and second positions,
(e) relay valve means having a normally seated valve member operative upon actuation to an unseated position to connect a pair of passageways, one of said passageways adapted to be connected to a pressure source,
(f) said relay valve means having a pair of diaphragms of different effective areas cooperating with said casing to define a plurality of pressure chambers,
(g) one of said diaphragms being common to a pair of adjacent pressure chambers of said plurality, one of said pair of adjacent pressure chambers being constantly in communication with said conduit means, and
(h) valve means cooperative with said selector valve means in its said first position for connecting said conduit means to the other of said pair of adjacent pressure chambers for actuating said relay valve means to thereby operate said valve member to its said unseated position upon pressurization of said conduit means with fluid up to a predetermined pressure,
(i) said selector valve means being operative in its second position to effect communication between said conduit means and the other of said pair of adjacent pressure chambers for actuating said relay valve means to thereby operate said valve member to its said unseated position responsively to pressurization of said conduit means to any pressure.

References Cited by the Examiner
UNITED STATES PATENTS

| | | | |
|---|---|---|---|
| 2,068,342 | 1/37 | McClure | 303—23 |
| 2,858,166 | 10/58 | Thomas | 303—22 |
| 2,919,165 | 12/59 | Cotter et al. | 303—22 |

FOREIGN PATENTS 472,223  9/37  Great Britain.

ARTHUR L. LA POINT, Primary Examiner.

EUGENE G. BOTZ, Examiner.